(12) United States Patent
Niwa et al.

(10) Patent No.: US 10,903,777 B2
(45) Date of Patent: Jan. 26, 2021

(54) VEHICLE CONTROL APPARATUS

(71) Applicant: JTEKT CORPORATION, Osaka (JP)

(72) Inventors: Tomohiro Niwa, Okazaki (JP); Satoru Mikamo, Okazaki (JP); Masashi Fuji, Toyota (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/553,225

(22) Filed: Aug. 28, 2019

(65) Prior Publication Data

US 2020/0076348 A1    Mar. 5, 2020

(30) Foreign Application Priority Data

Sep. 3, 2018   (JP) .................... 2018-164640

(51) Int. Cl.
*H02H 7/08*   (2006.01)
*H02P 29/024*   (2016.01)
*B62D 5/04*   (2006.01)

(52) U.S. Cl.
CPC .......... *H02P 29/024* (2013.01); *B62D 5/0463* (2013.01); *B62D 5/0484* (2013.01); *B62D 5/0487* (2013.01)

(58) Field of Classification Search
CPC ........ H02P 20/024; H02P 7/00; H02P 29/024; B62D 5/0487; B62D 5/0463; B62D 5/0484
See application file for complete search history.

(56) References Cited

U.S. PATENT DOCUMENTS

2013/0079976 A1   3/2013   Kuroda
2016/0229444 A1   8/2016   Toda et al.

FOREIGN PATENT DOCUMENTS

EP   3035523 A1   6/2016
JP   2006137318 A * 6/2006
JP   6109332 B2   4/2017

OTHER PUBLICATIONS

Jan. 28, 2020 Search Report issued in European Patent Application No. 19 19 4531.

* cited by examiner

*Primary Examiner* — Karen Masih
(74) *Attorney, Agent, or Firm* — Oliff PLC

(57) ABSTRACT

When one of two winding systems fails, an ECU transitions from a first state in which a target assist torque is produced using winding groups of the two winding systems to a second state in which using the remaining normal winding system. When the failed winding system has recovered to normal during an operation in the second state, the ECU carries out initial check that is inspection of the winding system recovered to normal prior to starting the power supply as follows. The ECU omits, from items of the initial check of the winding system recovered to normal, a specific item that is set as an item susceptible to an induced voltage generated in the winding group of the winding system recovered to normal as the motor is driven using the winding group of the normal winding system and carries out only the remainder items of the initial check.

5 Claims, 6 Drawing Sheets

VEHICLE CONTROL APPARATUS

INCORPORATION BY REFERENCE

The disclosure of Japanese Patent Application No. 2018-164640 filed on Sep. 3, 2018 including the specification, drawings and abstract, is incorporated herein by reference in its entirety.

BACKGROUND OF THE INVENTION

1. Field of the Invention

The invention relates to a vehicle control apparatus.

2. Description of Related Art

A control apparatus that controls a motor that is a source of an assist torque applied to a steering mechanism of a vehicle is conventionally known. For example, a control apparatus disclosed in Japanese Patent No. 6109332 (JP 6109332 B) controls power supply to a motor including two winding systems, a first winding system and a second winding system. The control apparatus includes a central processing unit (CPU), and two inverter circuits each corresponding to windings of one of the two winding systems. The CPU controls each of the inverter circuits in accordance with a steering state to thus independently control power supply to the windings of a corresponding one of the winding systems (dual-winding-system drive). Even when an anomaly occurs in a winding of the first winding system, for example, it is possible to run the motor by supplying power to the windings of the second winding system (single-winding-system drive).

When power is turned on, the CPU carries out what is generally referred to as initial check individually for each winding system. The initial check denotes an inspection for anomalies in parts, such as the windings of the motor and the inverter circuits, for driving the motor. When the CPU detects no anomaly in the winding systems, the CPU supplies power to the motor through the inverter circuits of the winding systems. However, when the CPU detects an anomaly in any one of the two winding systems, although it depends on a type of the anomaly, the CPU switches a motor driving method to the single-winding-system drive that uses windings of only a single winding system from the dual-winding-system drive that uses the windings of the two winding systems, for example.

The winding system in which the anomaly has occurred may recover to normal during the single-winding-system drive. In this case, the single-winding-system drive is preferably switched back to the dual-winding-system drive so that an assist torque of an appropriate magnitude is produced. However, the switching may bring about the following disadvantage. When recovering the driving method to the dual-winding-system drive from the single-winding-system drive, the CPU starts over from the initial check of the winding system recovered to normal, although it depends on product specifications. However, a situation in which a steering wheel is being operated when the initial check is carried out is conceivable. In such a situation, the CPU supplies power to the windings of the normal winding system in accordance with a steering state. As (a rotor of) the motor rotates, a voltage is induced in the windings of the winding system recovered to normal. When the initial check of the winding system recovered to normal is carried out while the motor is driven, the induced voltage generated in the windings of the winding system recovered to normal may cause the CPU to falsely detect a normal state as an abnormal state at some item of the initial check. In this case, the CPU cannot start supplying power to the windings of the winding system recovered to normal.

SUMMARY OF THE INVENTION

An object of the invention is to provide a vehicle control apparatus that allows, when an abnormal winding system has recovered to normal, quick use of the winding system recovered to normal.

A vehicle control apparatus according to an aspect of the invention includes a control circuit that controls power supply to winding groups included in a motor, each of the winding groups belonging to one of a plurality of winding systems, the control circuit independently controlling the power supply for each of the winding systems to cause the motor to produce a target torque. The control circuit is configured to transition between a first state in which the control circuit causes the motor to produce the target torque using the winding groups of the plurality of winding systems and a second state in which a part of the plurality of winding systems has failed and the control circuit causes the motor to produce the target torque using the winding group corresponding to the remaining winding system that is normal. When the failed winding system has recovered to normal during an operation in the second state, the control circuit carries out initial check that is an inspection of the winding system recovered to normal prior to starting the power supply, the initial check performed on only items of the initial check excluding a specific item that is set as an item susceptible to an induced voltage generated in the winding group of the recovered winding system due to the winding group of the normal winding system driving the motor.

In the second state in which a part of the plurality of winding system has failed and the control circuit causes the motor to produce the target torque using the winding group corresponding to the remaining winding system that is normal, power is supplied to the winding group of the normal winding system to drive the motor. As the motor is thus driven, a voltage is induced in the winding group of the winding system recovered to normal. The induced voltage generated in the winding group of the winding system recovered to normal may cause the control circuit to falsely determine a normal state as an abnormal state at some item of the initial check.

However, according to the above aspect, when, during the operation in the second state in which a part of the plurality of winding systems has failed and the motor is driven using the winding group of the remaining normal winding system, the failed winding system has recovered to normal, the control circuit carries out the inspection of only the items excluding the specific item susceptible to the induced voltage. This eliminates an undesirable situation in which although the actual inspection result of the specific item is normal, the recovered winding system is falsely determined as abnormal due to an influence of the induced voltage. When an abnormal winding system has recovered to normal, this allows quick use of the winding system recovered to normal.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 3 is a flowchart illustrating a procedure to be performed by a first microcomputer and a second microcomputer according to the first embodiment when power is turned on;

DETAILED DESCRIPTION OF EMBODIMENTS

Figure 1:
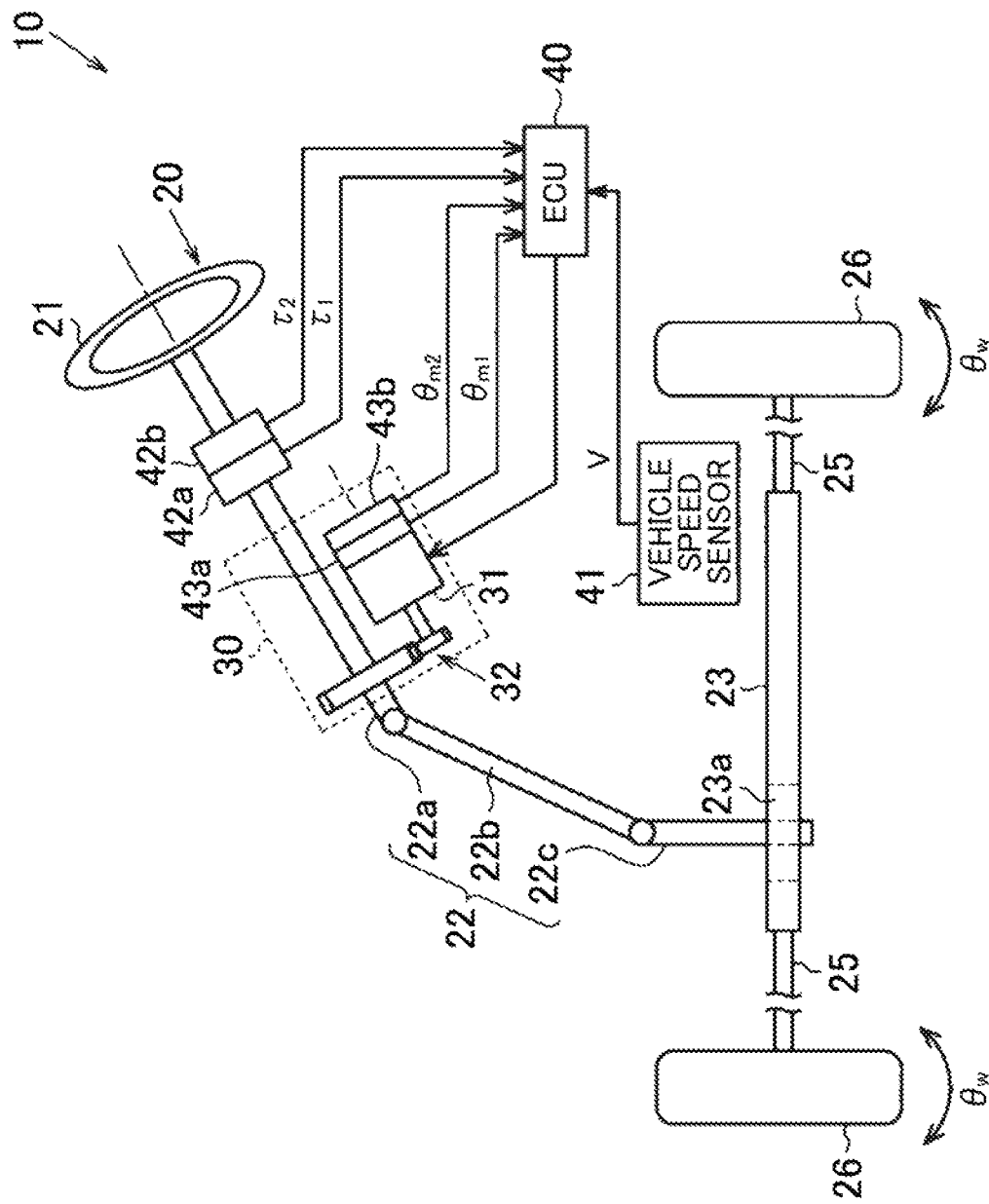
FIG. 1 is a diagram illustrating a schematic configuration of an electric power steering system in which a vehicle control apparatus (ECU) according to a first embodiment of the invention is mounted.

A vehicle control apparatus according to a first embodiment of the invention embodied as a control apparatus of an electric power steering system (hereinafter referred to as "EPS") is described below. As illustrated in FIG. 1, an EPS 10 includes a steering mechanism 20 that turns steered wheels based on a driver's steering operation, a steering assist mechanism 30 that assists the driver's steering operation, and an electronic control unit (ECU) 40 that controls actuation of the steering assist mechanism 30.

The steering mechanism 20 includes a steering wheel 21 operated by a driver and a steering shaft 22 that rotates integrally with the steering wheel 21. The steering shaft 22 includes a column shaft 22a connected to the steering wheel 21, an intermediate shaft 22a connected to a lower end portion of the column shaft 22a, and a pinion shaft 22c connected to a lower end portion of the intermediate shaft 22b. A lower end portion of the pinion shaft 22c is meshed with a rack shaft 23 (more specifically, a portion 23a where a rack tooth is provided) extending in a direction intersecting the pinion shaft 22c. A rotary motion of the steering shaft 22 is converted into a reciprocating linear motion of the rack shaft 23 through meshing between the pinion shaft 22c and the rack shaft 23. The reciprocating linear motion is transmitted to a right steered wheel 26 and a left steered wheel 26 each via a corresponding one of tie rods 25 that are coupled to respective ends of the rack shaft 23. As a result, a steered angle $\theta_w$ of the steered wheels 26 is changed.

The steering assist mechanism 30 includes a motor 31 that is a source of a steering assist force (assist torque). A three-phase brushless motor may be employed as the motor 31, for example. The motor 31 is coupled to the column shaft 22a via a reduction mechanism 32. The reduction mechanism 32 reduces a speed of rotation of the motor 31 and transmits a rotary force of the reduced speed to the column shaft 22a. Thus, a torque of the motor 31 is applied to the steering shaft 22 as a steering assist force to assist a driver's steering operation.

The ECU 40 obtains detection results of various sensors provided in the vehicle as information (state variables) indicating a driver's demand, a driving state, and a steering state and controls the motor 31 in accordance with the obtained various information. Examples of the various sensors include a vehicle speed sensor 41, torque sensors 42a and 42b, and rotation angle sensors 43a and 43b. The vehicle speed sensor 41 detects a vehicle speed (driving speed of the vehicle) V. The torque sensors 42a and 42b are provided on the column shaft 22a. The torque sensors 42a and 42a detect steering torques $\tau_1$ and $\tau_2$, respectively, applied to the steering shaft 22. The rotation angle sensors 43a and 43b are provided on the motor 31. The rotation angle sensors 43a and 43b detect rotation angles $\theta_{m1}$ and $\theta_{m2}$, respectively, of the motor 31.

The ECU 40 performs vector control of the motor 31 using the rotation angle $\theta_{m1}$, $\theta_{m2}$ of the motor 31 detected through the rotation angle sensors 43a, 43b. The ECU 40 performs assist control by calculating a target assist torque based on the steering torque $\tau_1$, $\tau_2$ and the vehicle speed V and supplying the motor 31 with driving power that causes the steering assist mechanism 30 to produce the calculated target assist torque.

Figure 2:
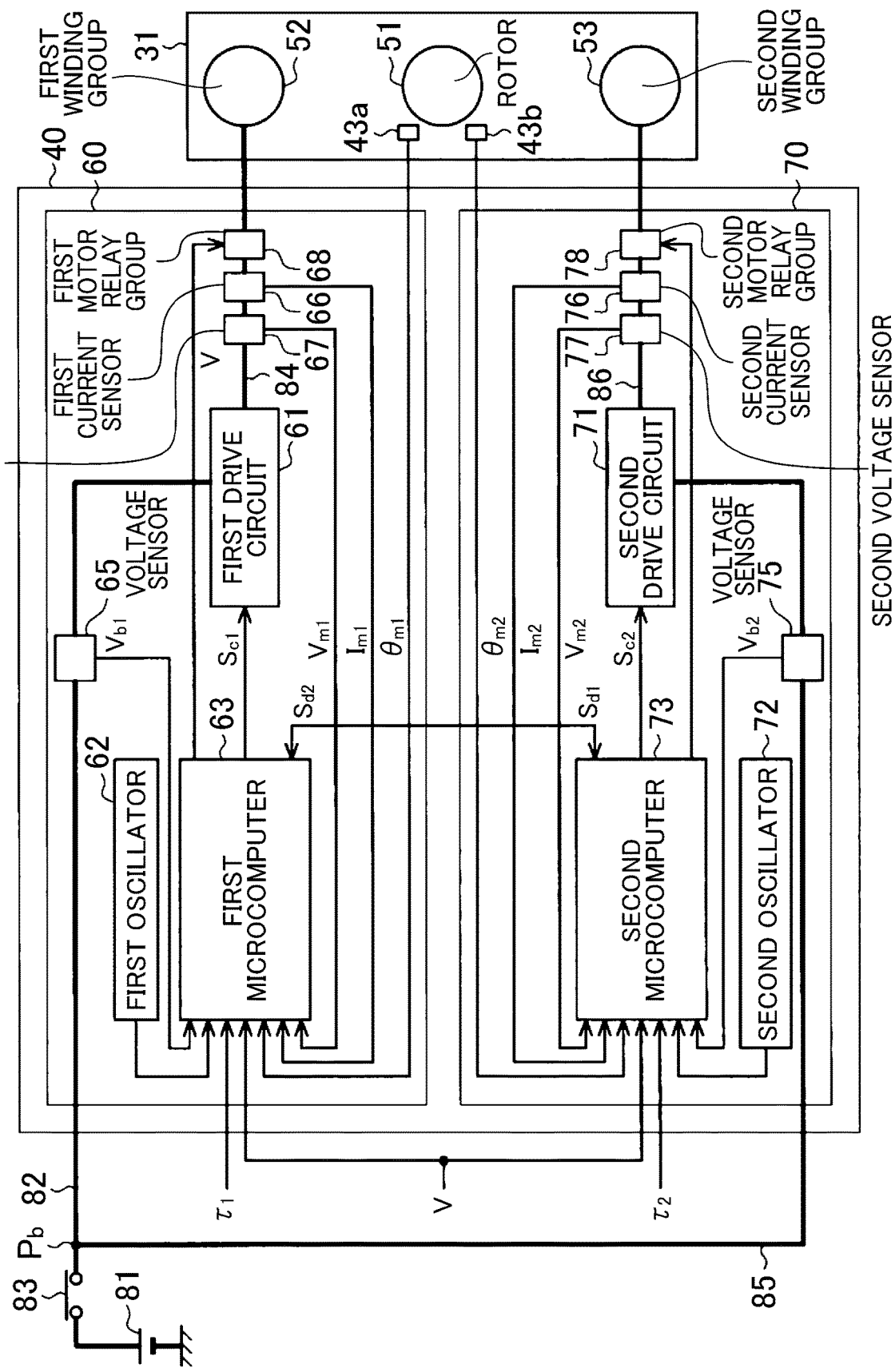
FIG. 2 is a block diagram illustrating the ECU according to the first embodiment.

A configuration of the motor 31 is described below. As illustrated in FIG. 2, the motor 31 includes a rotor 51, and a first winding group 52 and a second winding group 53 wound around stators (not illustrated). The first winding group 52 includes a U-phase coil, a V-phase coil, and a W-phase coil. The second winding group 53 includes a U-phase coil, a V-phase coil, and a W-phase coil as well.

The ECU 40 is detailed below. As illustrated in FIG. 2, the ECU 40 controls power supply to the first winding group 52 and the second winding group 53 for each of the winding systems. The ECU 40 includes a first control circuit 60 that controls power supply to the first winding group 52 and a second control circuit 70 that controls power supply to the second winding group 53.

The first control circuit 60 includes a first drive circuit 61, a first oscillator 62, and a first microcomputer 63. Electric power is supplied to the first drive circuit 61 from a direct-current (DC) power supply 81, such as a battery mounted in the vehicle. The first drive circuit 61 and the DC power supply 81 (more specifically, a positive terminal of the DC power supply 81) are connected by a first feeder 82. A power switch 83, such as an ignition switch, of the vehicle is provided on the first feeder 82. The power switch 83 is operated to actuate a drive source (e.g., an engine) for driving the vehicle. When the power switch 83 is turned on, power from the DC power supply 81 is supplied to the first drive circuit 61 via the first feeder 82. A voltage sensor 65 is provided on the first feeder 82. The voltage sensor 65 detects a voltage $V_{b1}$ of the DC power supply 81. When the power switch 83 is turned on, power from the DC power supply 81 is supplied to the first microcomputer 63 and the rotation angle sensor 43a through feeders (not illustrated).

The first drive circuit 61 is a pulse width modulation (PWM) inverter formed by connecting three legs in parallel. Each leg that is a basic unit is a switching device, such as series-connected two field-effect transistors (FETs), and corresponds to one of the three phases (U, V, and W). The first drive circuit 61 converts direct current power supplied from the DC power supply 81 into three-phase alternating current power by switching the switching device of each phase based on a command signal $S_{c1}$ generated by the first microcomputer 63. The three-phase alternating current power generated by the first drive circuit 61 is supplied to the first winding group 52 via a feeder path 84 consisting of bus bars or cables, for example, provided individually for each phase.

A first current sensor 66, a first voltage sensor 67, and a first motor relay group 68 are provided on the feeder path 84.

The first current sensor 66 detects a current $I_{m1}$ of each phase supplied to the first winding group 52 from the first drive circuit 61. The first voltage sensor 67 detects an output terminal voltage of each of the three phases of the first drive circuit 61 or, in other words, a terminal voltage $V_{m1}$ of each of the three phases of the first winding group 52. The first motor relay group 68 includes a U-phase relay, a V-phase relay, and a W-phase relay. The relays are normally kept on. When an anomaly, such as a disconnection failure or a short-circuit failure, occurs in the first drive circuit 61, the relays are each switched to off from on. When the relays are switched off, the feeder path 84 between the first drive circuit 61 and the first winding group 52 is shut off, and, accordingly, power supply to the first winding group 52 from the first drive circuit 61 is cut off. FETs may be employed as the U-phase relay, the V-phase relay, and the W-phase relay.

The first oscillator (clock generation circuit) 62 generates a clock that is a synchronization signal for operating the first microcomputer 63. The first microcomputer 63 performs various types of processing in accordance with the clock generated by the first oscillator 62. The first microcomputer 63 calculates a target assist torque to be produced by the motor 31 based on the steering torque $\tau_1$ detected through the torque sensor 42a and the vehicle speed V detected through the vehicle speed sensor 41, and calculates a first current command value in accordance with the calculated target assist torque.

The first current command value is a target value of current to be supplied to the first winding group 52 so that the target assist torque of an appropriate magnitude is produced in accordance with the steering torque $\tau_1$ and the vehicle speed V. The first microcomputer 63 calculates the first current command value such that the larger an absolute value of the steering torque $\tau_1$ and the lower the vehicle speed V, the larger (an absolute value of) the first current command value is. The first current command value (absolute value) is set to a half (50%) of the amount of current (100%) necessary for causing the motor 31 to produce the target assist torque.

The first microcomputer 63 generates the command signal $S_{c1}$ (PWM signal) for the first drive circuit 61 by performing current feedback control that causes an actual value of current supplied to the first winding group 52 to follow the first current command value. The command signal $S_{c1}$ defines a duty ratio of each of the switching devices of the first drive circuit 61. The duty ratio means a ratio of a period during which the switching device is on to a pulse cycle. The first microcomputer 63 controls power supply to the first winding group 52 using the rotation angle $\theta_{m1}$ of (the rotor 51 of) the motor 31 detected through the rotation angle sensor 43a. Electric current is supplied to the first winding group 52 in accordance with the command signal $S_{c1}$ through the first drive circuit 61, causing the first winding group 52 to produce a torque in accordance with the first current command value.

The second control circuit 70 is basically identical in configuration to the first control circuit 60. More specifically, the second control circuit 70 includes a second drive circuit 71, a second oscillator 72, and a second microcomputer 73.

Electric power is supplied to the second drive circuit 71 from the DC power supply 81. A junction $P_b$ is provided on the first feeder 82 between the power switch 83 and the first control circuit 60. The junction $P_b$ and the second drive circuit 71 are connected by a second feeder 85. When the power switch 83 is turned on, power from the DC power supply 81 is supplied to the second drive circuit 71 via the second feeder 85. A voltage sensor 75 is provided on the second feeder 85. The voltage sensor 75 detects a voltage $V_{b2}$ of the DC power supply 81.

Three-phase alternating current power generated by the second drive circuit 71 is supplied to the second winding group 53 via a feeder path 86 consisting of bus bars or cables, for example, provided individually for each phase. A second current sensor 76, a second voltage sensor 77, and a second motor relay group 78 are provided on the feeder path 86. The second current sensor 76 detects a current $I_{m2}$ supplied to the second winding group 53 from the second drive circuit 71. The second voltage sensor 77 detects an output terminal voltage of each of the three phases of the second drive circuit 71 or, in other words, a terminal voltage $V_{m2}$ of each of the three phases of the second winding group 53. The second motor relay group 78 includes a U-phase relay, a V-phase relay, and a W-phase relay. The relays are normally kept on. When an anomaly, such as a disconnection failure or a short-circuit failure, occurs in the second drive circuit 71, the relays are each switched to off from on. When the relays are switched off, the feeder path 86 between the second drive circuit 71 and the second winding group 53 is shut off, and, accordingly, power supply to the second winding group 53 from the second drive circuit 71 is cut off.

The second microcomputer 73 calculates a target assist torque to be produced by the motor 31 based on the steering torque $\tau_2$ detected through the torque sensor 42a and the vehicle speed V detected through the vehicle speed sensor 41, and calculates a second current command value in accordance with the calculated target assist torque. The second current command value (absolute value) is set to a half (50%) of the amount of current (100%) necessary for causing the motor 31 to produce the target assist torque. The second microcomputer 73 generates a command signal $S_{c2}$ for the second drive circuit 71 by performing current feedback control that causes an actual value of current supplied to the second winding group 53 to follow the second current command value. Electric current is supplied to the second winding group 53 in accordance with the command signal $S_{c2}$ through the second drive circuit 71, causing the second winding group 53 to produce a torque in accordance with the second current command value.

The first microcomputer 63 and the second microcomputer 73 exchange digital signals over a communication line. As a specification for communication between the first microcomputer 63 and the second microcomputer 73, for example, serial peripheral interface (SPI) that is a synchronous serial communication interface specification may be employed. Each of the first microcomputer 63 and the second microcomputer 73 has a function that detects an anomaly in itself and the corresponding winding system to which the microcomputer belongs.

The first microcomputer 63 generates a first state signal $S_{d1}$ as a digital signal, indicating a state of a first winding system to which the first microcomputer 63 belongs, and feeds the generated first state signal $S_{d1}$ to the second microcomputer 73. The first state signal $S_{d1}$ contains an anomaly occurrence state, an assist state, and an assist value of the first winding system. The anomaly occurrence state includes whether an anomaly occurs in the first microcomputer 63, the first drive circuit 61, and the rotation angle sensor 43a, for example. The assist state is a binary state of either a state in which the first microcomputer 63 can perform assist control or a state in which the first microcomputer 63 cannot perform assist control due to a decrease in power supply voltage, for example. The state in which the first microcomputer 63 can perform assist control is a binary state of either a state in which assist control is being performed or a state in which assist control is on standby for start of assist control (assist-start standby). The assist value is a magnitude of an assist torque the first winding group 52 produces and corresponds to the first current command value that is a target value of current to be supplied to the first winding group 52.

As does the first microcomputer 63, the second microcomputer 73 generates a second state signal $S_{d2}$ as a digital signal, indicating a state of a second winding system to which the second microcomputer 73 belongs, and feeds the generated second state signal $S_{d2}$ to the first microcomputer 63.

When power is turned on, (the first microcomputer 63 and the second microcomputer 73 of) the ECU 40 carries out what is generally referred to as initial check individually for each of the winding systems. As the initial check, the first microcomputer 63 inspects for anomalies in parts for driving the motor 31 of the first winding system to which the first microcomputer 63 belongs. The parts include the first winding group 52, the first drive circuit 61, and the first motor relay group 68. As the initial check, the second microcomputer 73 inspects for anomalies in parts for driving the motor 31 of the second winding system to which the second microcomputer 73 belongs. The parts include the second winding group 53, the second drive circuit 71, and the second motor relay group 78.

Operations of the first microcomputer 63 when power is turned on are described below. As illustrated in the flowchart of FIG. 3, triggered by power-on, the first microcomputer 63 carries out the initial check of the first winding system (step S101) and determines whether a result of the initial check is normal (step S102).

Upon determining that the result of the initial check is normal (step S102: YES), the first microcomputer 63 enters a state in which the first microcomputer 63 is permitted to perform assist control (step S103). If the steering wheel 21 is not operated in the state in which the first microcomputer 63 is permitted to perform assist control, the first microcomputer 63 is held in the assist-start standby state. If the steering wheel 21 is operated in the assist-start standby state, the first microcomputer 63 performs assist control that controls power supply to the first winding group 52 in accordance with a steering state.

Upon determining that the result of the initial check is not normal (step S102: NO), the first microcomputer 63 performs predetermined fail-safe control (step S104). As the fail-safe control, for example, the first microcomputer 63 stops performing assist control (controlling power supply to the first winding group 52) on the motor 31. In addition, the first microcomputer 63 generates the first state signal $S_{d1}$ containing information indicating that an anomaly is detected in the first winding system, and transmits the generated first state signal $S_{d1}$ to the second microcomputer 73.

Figure 3:
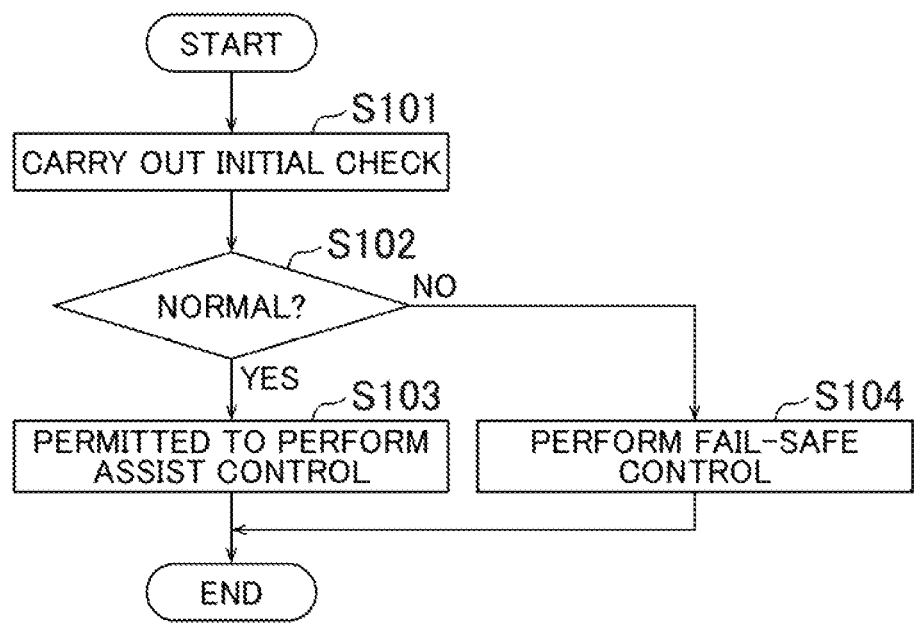

Triggered by power-on, the second microcomputer 73 carries out the initial check of the second winding system independently from the first winding system through the procedure illustrated in the flowchart of FIG. 3 as the first microcomputer 63.

Even when the second microcomputer 73 recognizes that assist control by the first winding system cannot be performed based on the first state signal $S_{d1}$, if a result of the initial check of the second winding system is normal, the second microcomputer 73 starts performing assist control in accordance with a steering state. In this case, power is supplied only to the second winding group 53 belonging to the normal winding system. More specifically, a method of driving the motor 31 that is used by the ECU 40 is switched from the dual-winding-system drive (a first state) in which power supply to the winding groups of the two winding systems is controlled to the single-winding-system drive (a second state) in which power supply only to a winding group of a single winding system is controlled.

The second microcomputer 73 in the normal winding system may be configured such that, when the second microcomputer 73 recognizes that assist control by the first winding system cannot be performed, the second microcomputer 73 causes a half of the target assist torque to be produced by the second winding group 53 as usual, or alternatively may be configured to cause the entire target assist torque to be produced by the second winding group 53. When the configuration in which the entire target assist torque is produced by the second winding group 53 is employed, a target value of current (the second current command value) supplied to the second winding group 53 is set to a value twice the value of normal times in which the dual-winding-system drive is performed (a value corresponding to the amount of current necessary for causing the motor 31 to produce the target assist torque).

Controlling power supply to the winding groups of the two winding systems of the motor 31 independently as described above allows running the motor 31 by supplying power to the winding group of the second winding system even when an anomaly occurs in the first winding system. When the single-winding-system drive is performed, the winding system in which the anomaly has occurred may recover to normal. In this case, it is preferable to switch back the method of driving the motor 31 used by the ECU 40 to the dual-winding-system drive from the single-winding-system drive so that an assist torque of a more appropriate magnitude is produced.

However, the switching may bring about the following disadvantage. For example, when the first winding system has recovered to a normal state from an abnormal state, although it depends on product specifications, the first microcomputer 63 starts over from the initial check of the winding system to which the first microcomputer 63 belongs (hereinafter referred to as "its own winding system"). However, a situation in which a steering wheel is being operated when the initial check is started over is conceivable. In this case, the second microcomputer 73 supplies power to the second winding group 53 in accordance with the steering state on condition that the second winding system is in a normal state. However, as the thus-supplied power causes (the rotor 51 of) the motor 31 to rotate, a voltage is induced in the winding group of the winding system recovered to normal (in the first embodiment, the first winding group 52). The induced voltage generated in the first winding group 52 may cause the first microcomputer 63 to falsely detect a normal state as an abnormal state at some item of the initial check. Such a false detection in the initial check may occur in the initial check carried out by the second microcomputer 73 on its own winding system when the second winding system has recovered to a normal state from an abnormal state as in the case described above.

The first microcomputer 63 is monitoring the power supply voltage (the voltage $V_{b1}$ of the DC power supply 81) through the voltage sensor 65 to prevent an abnormal operation that may be caused by a drop in the power supply voltage, for example. Upon detecting that the power supply voltage has dropped below a lower limit of a guaranteed operating range of the first microcomputer 63 at an instantaneous power interruption, for example, the first microcomputer 63 resets (initializes) its internal state. When the power supply voltage increases back to a value within the guaranteed operating range, the first microcomputer 63 starts up and carries out the initial check. As the first microcomputer 63, the second microcomputer 73 is monitoring the power supply voltage (the voltage $V_{b2}$ of the DC power supply 81). The induced voltage generated in the motor 31 described above may cause a false determination of determining a normal state as an abnormal condition also in the initial check carried out when the first microcomputer 63 and the second microcomputer 73 are reset.

Among various items of the initial check, an item whose inspection result may be susceptible to the induced voltage generated in the motor 31 is inspection of the first motor relay group 68 and the second motor relay group 78. The first motor relay group 68 may be inspected by, for example, sequentially inspecting whether a voltage is generated across the feeder path 84 with (each relay of the three phases of) the first motor relay group 68 open or closed and whether a voltage is generated cross the feeder path 84 with each of the switching devices of the first drive circuit 61 driven. The second motor relay group 78 may be inspected as is the first motor relay group 68.

For example, if the first microcomputer 63 detects that a voltage is generated across the feeder path 84 through the first voltage sensor 67 although the first microcomputer 63 has issued a command that holds the first drive circuit 61 in a driving state and the first motor relay group 68 in an open state, the first microcomputer 63 detects that an anomaly, such as deposition, has occurred in the first motor relay group 68. When the first winding system has recovered to normal and the first microcomputer 63 starts over the initial check of its own winding system, an undesirable situation in which, although the first motor relay group 68 is held in the open state properly in accordance with the command, an induced voltage generated in the first winding group 52 is detected through the first voltage sensor 67, resulting in false detection of detecting as being in an abnormal state may occur.

Under the circumstances, according to the first embodiment, items of the initial check carried out by the microcomputer belonging to the winding system recovered to normal are varied from items of check carried out when power is turned on depending on an operating state of the normal winding system.

Operations of the microcomputers when an abnormal winding system has recovered to normal are described below. An example in which assist control using the first winding group 52 is stopped because an anomaly has occurred in the first winding system is described below.

Figure 4:
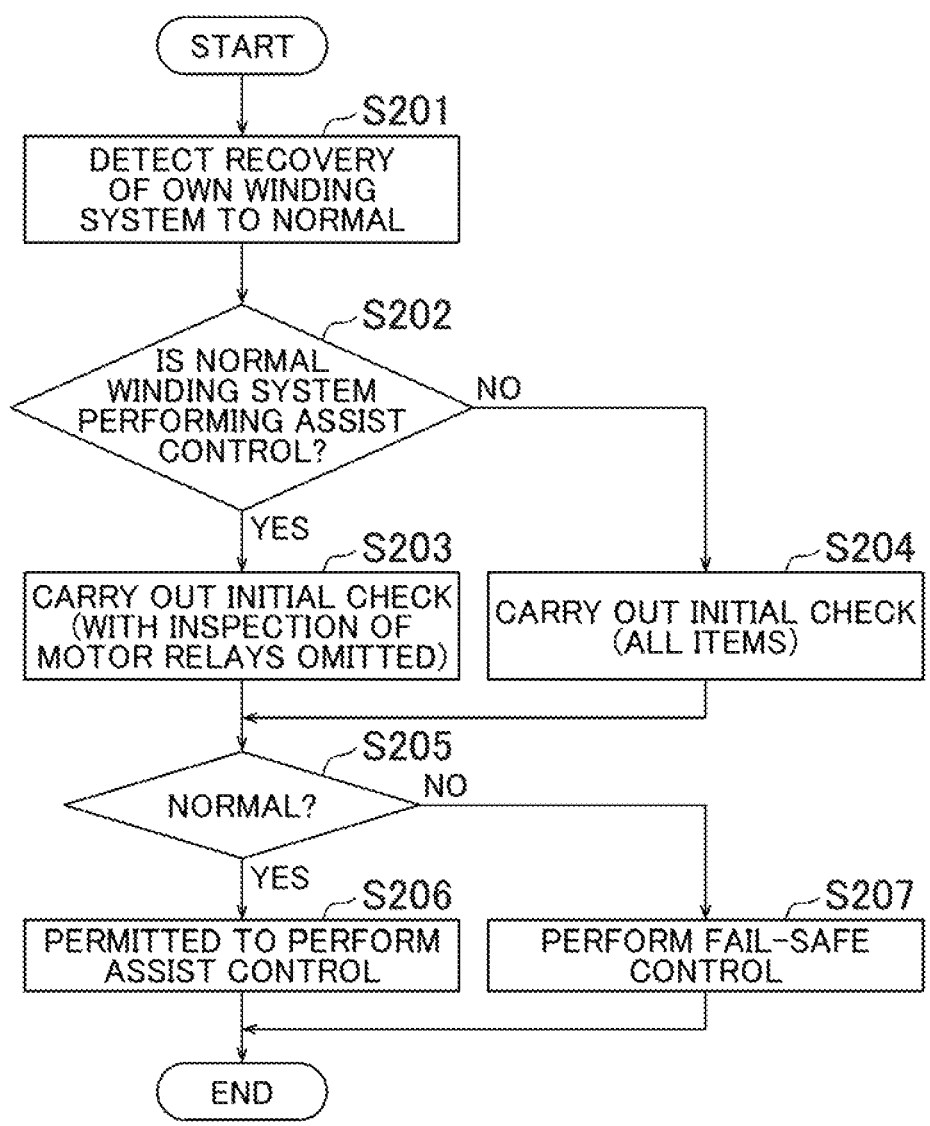
FIG. 4 is a flowchart illustrating a procedure to be performed when a winding system has recovered to normal by the microcomputer of the recovered winding system according to the first embodiment.

As illustrated in the flowchart of FIG. 4, when the first microcomputer 63 detects that its own winding system has recovered to normal (step S201), the first microcomputer 63 determines whether the second winding system that is the normal winding system is performing assist control (step S202).

When the first microcomputer 63 determines that the second microcomputer 73 is performing assist control based on the second state signal $S_{d2}$ (step S202: YES), the first microcomputer 63 carries out the initial check of its own winding system (step S203). Note that the first microcomputer 63 omits (skips) inspection of the first motor relay group 68 of its own winding system in step S203. The first microcomputer 63 carries out inspection of all the items excluding inspection of the first motor relay group 68. Meanwhile, even when an anomaly has occurred in the first motor relay group 68, phenomenon such as lock of the motor 31, reverse assist or self-steering does not occur.

When the first microcomputer 63 determines that the second microcomputer 73 is not performing assist control based on the second state signal $S_{d2}$ (step S202: NO), the first microcomputer 63 carries out the initial check of its own winding system (step S204). Note that the first microcomputer 63 carries out inspection of all the items including inspection of the first motor relay group 68 of its own winding system in step S204. The state in which the second microcomputer 73 is not performing assist control is a state in which power is not supplied to the second winding group 53 or, in other words, the second microcomputer 73 is in the assist-start standby state.

The first microcomputer 63 determines whether a result of the initial check carried out in step S203 or step S204 is normal (step S205).

Upon determining that the result of the initial check is normal (step S205: YES), the first microcomputer 63 enters the state in which the first microcomputer 63 is permitted to perform assist control (step S206).

Upon determining that the result of the initial check is not normal (step S205: NO), the first microcomputer 63 performs predetermined fail-safe control (step S207).

On condition that the first winding system is in a normal state, when the second winding system has recovered to a normal state from an abnormal state, the second microcomputer 73 operates according to the procedure illustrated in the flowchart of FIG. 4 as the first microcomputer 63. More specifically, when the first microcomputer 63 is performing assist control, the second microcomputer 73 skips inspection of the second motor relay group 78 of its own winding system (step S203 of FIG. 4). Only when the first microcomputer 63 is not performing assist control, the second microcomputer 73 carries out inspection of all the items including inspection of the second motor relay group 78 (step S204 of FIG. 4).

The first embodiment provides the following advantages.

(1) When the first winding system, for example, has recovered to a normal state from an abnormal state, the first microcomputer 63 carries out the initial check of its own winding system. When carrying out the initial check, if the second winding system that is the normal winding system is performing assist control, the first microcomputer 63 skips (omits) inspection of the first motor relay group 68 that is susceptible to an induced voltage generated in the first winding group 52. This eliminates the need for waiting until all the items of the initial check are determined as normal, thus allowing quick recovery to the dual-winding-system drive from the single-winding-system drive when the abnormal winding system has recovered to normal. Furthermore, smooth vehicle behavior or comfortable driving can be obtained. Also when the second winding system has recovered to a normal state from an abnormal state, the initial check is carried out as in the case where the first winding system has recovered to normal.

(2) When the second microcomputer 73 is not performing assist control (is in the assist-start standby state), the first microcomputer 63 carries out inspection of all the items including inspection of the first motor relay group 68. When power is not supplied to the first motor relay group 68, (the rotor 51 of) the motor 31 is stopped, and therefore a voltage is not induced in the second winding group 53. By carrying out inspection of the first motor relay group 68 of the winding system recovered to normal only when power is not supplied to the first winding group 52 belonging to the normal winding system, a result of the inspection is not affected by an induced voltage generated in the first winding group 52. This allows the initial check of the first motor relay group 68 to yield an accurate inspection result. Also when the second winding system has recovered to a normal state from an abnormal state, the initial check is carried out as in the case where the first winding system has recovered to normal.

(3) The induced voltage generated in the motor 31 described above may disadvantageously cause a false determination of determining a normal state as an abnormal condition also in the initial check carried out when the first microcomputer 63 and the second microcomputer 73 are reset due to a drop in the power supply voltage (the voltage $V_{b1}$, $V_{b2}$ of the DC power supply 81). However, according to the first embodiment, in a situation (in the first embodiment, the situation in which the normal winding system is performing assist control) in which a normal state may be falsely determined as an abnormal state, the initial check is carried out with a specific inspection item (in the first embodiment, inspection of the first motor relay group 68 or the second motor relay group 78) skipped (omitted). This allows avoiding false determination in the initial check. Even when the power supply voltage drops or fluctuates, normal operations of the ECU 40 and smooth vehicle behavior can be obtained.

(4) When an anomaly occurs in any one of the two winding systems, power is supplied to the winding group of the normal winding system to continue driving the motor 31. For such a situation, a configuration in which an entire assist torque (target assist torque) that the motor 31 is required to produce is produced by the winding group of the normal winding system may be employed. More specifically, a target value of current to be supplied to the winding group of the normal winding system is set to a duplicated value of the value for normal times in which the dual-winding-system drive is performed (a value corresponding to the amount of current necessary for causing the motor 31 to produce the target assist torque). Hence, the motor 31 produces an assist torque of a magnitude similar to that produced when the dual-winding-system drive is performed even if an anomaly occurs in one of the winding systems. This allows performing appropriate steering assist continuously.

(5) Note that, if the configuration described above in which when an anomaly occurs in any one of the two winding systems, the entire required assist torque is produced by the winding group of normal winding system is employed, a current load on the normal winding system is duplicated compared to a current load on the same performing the dual-winding-system drive. Hence, it is preferable to switch to the dual-winding-system drive quickly when an abnormal winding system has recovered to normal. As described above, when an abnormal winding system has recovered to normal, the initial check of the winding system recovered to normal is carried out. If the initial check yields a false determination of determining a normal state as an abnormal state, switching to the dual-winding-system drive is delayed by the time corresponding to the false determination. This is because switching to the dual-winding-system drive is not effected and the single-winding-system drive is continued until the recovered winding system is determined as being normal in the initial check started over.

However, according to the first embodiment, in a situation (in the first embodiment, the situation in which the normal winding system is performing assist control) in which a normal state may be falsely determined as an abnormal state, the initial check is carried out with a specific check item (in the first embodiment, inspection of the first motor relay group 68 or the second motor relay group 78) skipped (omitted). This allows avoiding false determination in the initial check. This eliminates needless prolongation of a period in which the single-winding-system drive is performed due to false determination in the initial check. Accordingly, degradation of electronic components, such as the first drive circuit 61 and the second drive circuit 71, and the first winding group 52 and the second winding group 53, can be reduced.

A vehicle control apparatus according to a second embodiment of the invention is described below. The second embodiment is basically identical in configuration to the first embodiment illustrated in FIG. 1 and FIG. 2. The second embodiment differs from the first embodiment in procedure to be performed by the microcomputer of the recovered winding system when a winding system has recovered to normal. The second embodiment is also described through an example in which the second winding system is in a normal state and the first winding system has recovered to a normal state from an abnormal state.

Figure 5:
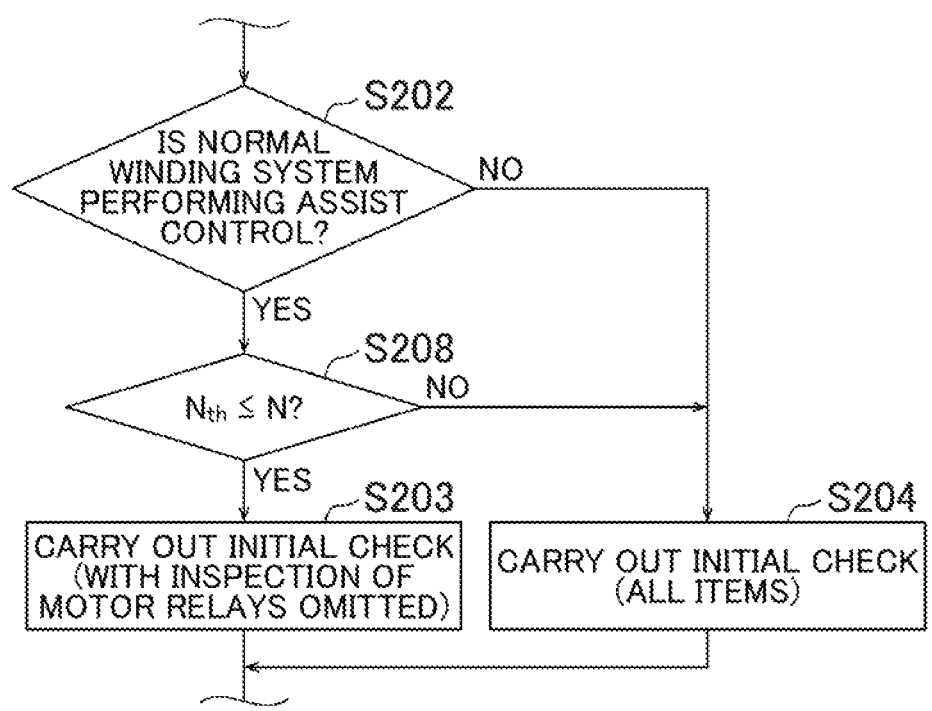
FIG. 5 is a flowchart illustrating a procedure to be performed when a winding system has recovered to normal by the microcomputer of the recovered winding system according to a second embodiment.

As illustrated in the flowchart of FIG. 5, when the winding system to which the first microcomputer 63 belongs has recovered to normal, the first microcomputer 63 determines whether the second microcomputer 73 belonging to the normal winding system is performing assist control (step S202).

When the first microcomputer 63 determines that the second microcomputer 73 is performing assist control based on the second state signal $S_{d2}$ (step S202: YES), the first microcomputer 63 determines whether a number of rotations (hereinafter referred to as the rotation number) N of the motor 31 is equal to or above a rotation number threshold value $N_{th}$ (step S208).

The rotation number (rotation speed) N is obtained by differentiating the rotation angles $\theta_{m1}$, $\theta_{m2}$ detected through the rotation angle sensors 43a, 43b, respectively, for example. The rotation number threshold value $N_{th}$ is set with reference to a rotation number corresponding to the induced voltage of a magnitude that is unlikely to affect a result of the initial check (inspection of the first motor relay group 68 or the second motor relay group 78) carried out on the winding system recovered to a normal state from an abnormal state during a steering operation (a state in which the motor 31 is under the single-winding-system drive).

Upon determining that the rotation number N of the motor 31 is equal to or above the rotation number threshold value $N_{th}$ (step S208: YES), the first microcomputer 63 skips inspection of the first motor relay group 68 of its own winding system and carries out inspection of the other items.

Upon determining that the rotation number N of the motor 31 is not equal to or above the rotation number threshold value $N_{th}$ (step S208: NO), the first microcomputer 63 carries out inspection of all the items of its own winding system (step S204).

On condition that the first winding system is in a normal state, when the second winding system has recovered to a normal state from an abnormal state, the second microcomputer 73 operates according to the procedure illustrated in the flowchart of FIG. 5 as the first microcomputer 63.

The second embodiment provides the following advantage. (6) Even when a normal winding system is performing assist control, if the rotation number N of the motor 31 is below the rotation number threshold value $N_{th}$, an induced voltage generated in the winding group of a winding system recovered to normal is considerably small. Hence, even when the normal winding system is performing assist control, influence of the induced voltage on a result of the initial check (inspection of the first motor relay group 68 or the second motor relay group 78) of the recovered winding system is small. The second embodiment allows quick recovery to the dual-winding-system drive from the single-winding-system drive when an abnormal winding system has recovered to normal.

A vehicle control apparatus according to a third embodiment is described below. The third embodiment is basically identical in configuration to the first embodiment illustrated in FIG. 1 and FIG. 2.

Figure 6:
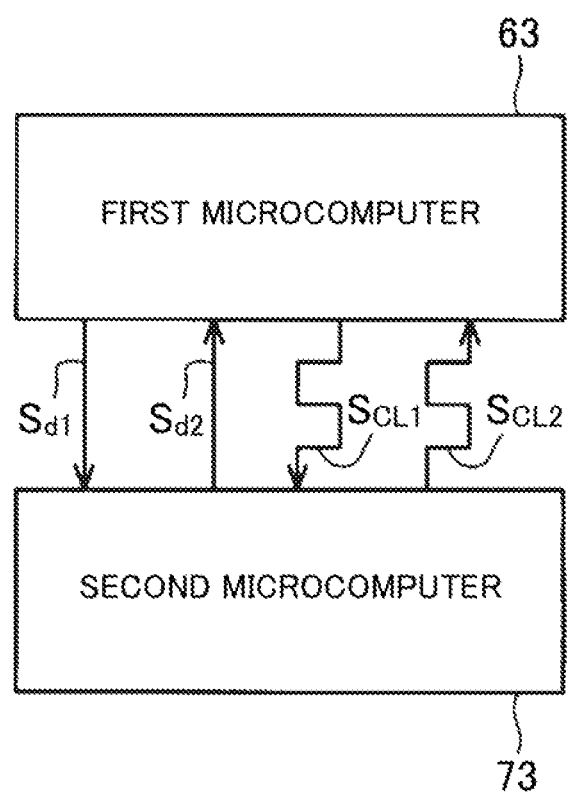
FIG. 6 is a block diagram illustrating signal exchange between the first microcomputer and the second microcomputer according to a third embodiment.

As illustrated in FIG. 6, the first microcomputer 63 and the second microcomputer 73 exchange the following four signals (A1) to (A4). (A1): First state signal $S_{d1}$. The first state signal $S_{d1}$ contains an anomaly occurrence state, an assist state, and an assist value of the first winding system.

(A2): Second state signal $S_{d2}$. The second state signal $S_{d2}$ contains an anomaly occurrence state, an assist state, and an assist value of the second winding system. (A3): First clock $S_{CL1}$. The first clock $S_{CL1}$ generated by the first oscillator 62 is a periodic pulse indicating that the first microcomputer 63 is in a normal state. The first clock $S_{CL1}$ is exchanged between the first microcomputer 63 and the second microcomputer 73 over a first signal line provided separately from the SPI communication line.

(A4): Second clock $S_{CL2}$. The second clock $S_{CL2}$ generated by the second oscillator 72 is a periodic pulse indicating that the second microcomputer 73 is in a normal state. The second clock $S_{CL2}$ is exchanged between the first microcomputer 63 and the second microcomputer 73 over a second signal line provided separately from the SPI communication line.

As illustrated in the flowchart of FIG. 4, for example, when the first microcomputer 63 detects that its own winding system has recovered to normal (step S201), the first microcomputer 63 changes items of the initial check of its own winding system depending on whether the second microcomputer 73 of the normal winding system is performing assist control. For this process, the first microcomputer 63 belonging to the recovered winding system determines whether the second microcomputer 73 of the normal winding system is performing assist control based on the second state signal $S_{d2}$ generated by the second microcomputer 73. Accordingly, the first microcomputer 63 cannot determine whether the second microcomputer 73 is performing assist control when the first microcomputer 63 receives no response from the second microcomputer 73 and cannot obtain the second state signal $S_{d2}$.

When the first microcomputer 63 belonging to the recovered winding system cannot obtain the second state signal $S_{d2}$ from the second microcomputer 73 belonging to the normal winding system, the first microcomputer 63 detects an operating state of the second microcomputer 73 as follows.

When neither the second state signal $S_{d2}$ nor the second clock $S_{CL2}$ is obtained, the first microcomputer 63 recognizes that the second microcomputer 73 stops operating. In this state, the second microcomputer 73 cannot perform assist control. Hence, the first microcomputer 63 determines that the second microcomputer 73 is not performing assist control in step S202 of the flowchart of FIG. 4 (step S202: NO), and advances processing to step S204.

If the second clock $S_{CL2}$ is obtained even when the second state signal $S_{d2}$ is not obtained, the first microcomputer 63 recognizes that an anomaly has occurred only in the communication line over which the second state signal $S_{d2}$ is to be exchanged and that the second microcomputer 73 is operating. However, in this case, the first microcomputer 63 cannot detect whether the second microcomputer 73 is performing assist control (controlling power supply to the second winding group 53). Because the second microcomputer 73 may possibly be performing assist control, the first microcomputer 63 may determine whether the second microcomputer 73 is performing assist control in step S202 of the flowchart of FIG. 4 (step S202: YES) and advance processing to step S203.

If the second clock $S_{CL2}$ is obtained even when the second state signal $S_{d2}$ is not obtained, the first microcomputer 63 may operate as follows. For example, when the first microcomputer 63 issues a command to stop operating to the second microcomputer 73, and then recognizes that the second microcomputer 73 stops operating based on that the second clock $S_{CL2}$ is not obtained, the first microcomputer 63 may advance processing to step S204 from step S202 of the flowchart of FIG. 4.

When the second winding system has recovered to a normal state from an abnormal state, the second microcomputer 73 operates in accordance with the procedure illustrated in the flowchart of FIG. 5 as the first microcomputer 63.

The third embodiment provides the following advantage.
(7) Even when an abnormal winding system has recovered to normal, but the state signal ($S_{d1}$, $S_{d2}$) cannot be obtained from the microcomputer (63, 73) of a normal winding system, whether to skip (omit) inspection of the motor relay group (68, 78) in (from) the initial check that is to be carried out when a winding system has recovered to normal can be determined based on the clock ($S_{CL1}$, $S_{CL2}$) indicating an operating state of the microcomputer of the normal winding system.

The embodiments may be modified as follows. According to the first to third embodiments, the ECU 40 includes the first control circuit 60 and the second control circuit 70 that are independent from each other. Alternatively, although it depends on the product specifications, the first microcomputer 63 and the second microcomputer 73 may be constructed as a single microcomputer, for example.

According to the first to third embodiments, power supply to the winding groups (52 and 53) of the two winding systems is controlled independently. When the motor 31 includes winding groups each belonging to one of three or more winding systems, power supply to the winding groups of the three or more winding systems may be controlled independently. When the motor 31 includes winding groups of three or more winding systems, the ECU 40 may include individual control circuits corresponding to the respective winding systems.

The first to third embodiments describe an example in which an EPS that transmits a torque of the motor 31 to (the column shaft 22a of) the steering shaft 22 is employed as the EPS 10. Alternatively, an EPS that transmits a torque of the motor 31 to the rack shaft 23 may be employed as the EPS 10.

In the first to third embodiments, the vehicle control apparatus is embodied as the ECU 40 that controls the motor 31 of the EPS 10. Alternatively, the vehicle control apparatus may be embodied as a control apparatus for a steer-by-wire steering system in which power transmission between the steering wheel 21 and the steered wheels 26 is separated. Such a steer-by-wire steering system typically includes a reactive motor that is a source of a steering reaction force applied to a steering shaft and a steering operation motor that is a source of a steering operation force that turns steered wheels. A motor including winding groups of a plurality of winding systems as in the first to third embodiments is employed as each of the reactive motor and the steering operation motor. The control apparatus for the steer-by-wire steering system controls power supply to the winding groups of the plurality of winding systems of the reactive motor and the steering operation motor independently for each of the winding systems.

In the first to third embodiments, the vehicle control apparatus is embodied as the ECU 40 that controls the motor 31 of the EPS 10. Alternatively, the vehicle control apparatus may be embodied as a control apparatus of a motor used in vehicle-mounted equipment other than a steering system such as the EPS 10.

What is claimed is:

1. A vehicle control apparatus comprising:
   a control circuit that controls power supply to winding groups included in a motor, each of the winding groups belonging to one of a plurality of winding systems, the control circuit independently controlling the power supply for each of the winding systems to cause the motor to produce a target torque, wherein
   the control circuit is configured to:
      transition between a first state in which the control circuit causes the motor to produce the target torque using the winding groups of the plurality of winding systems and a second state in which a part of a first winding system, of the plurality of winding systems, has failed;
      cause the motor to produce the target torque using a winding group corresponding to a second winding system, of the plurality of winding systems, that is normal; and
      when the first winding system has recovered to normal during an operation in the second state, (i) perform an initial check that is an inspection of the first winding system recovered to normal prior to starting the power supply, and (ii) exclude, from items of the initial check, an item that is set as an item susceptible to an induced voltage generated in a winding group of the recovered winding system due to the winding group of the second winding system driving the motor.

2. The vehicle control apparatus according to claim 1, wherein
   the control circuit is configured to control the power supply to the winding groups of the plurality of winding systems through a drive circuit provided corresponding to each of the winding systems independently for each of the winding systems, and
   the item excluded from the item check is an inspection of a switch provided on a feeder path between the drive circuit and the winding group of a winding system corresponding to the drive circuit.

3. The vehicle control apparatus according to claim 1, wherein even when the first winding system has recovered to normal during the operation in the second state, if a rotation number of the motor is below a rotation number threshold value that is set with reference to a rotation number of the motor corresponding to the induced voltage of a magnitude that is without affecting an inspection result of the item excluded from the initial check, the control circuit is configured to perform all the items of the initial check of the first winding system recovered to normal.

4. The vehicle control apparatus according to claim 1, wherein
   the control circuit includes individual control circuits corresponding to the respective winding systems, each of the individual control circuits independently controlling the power supply to the winding group of the corresponding one of the plurality of winding systems, and
   the individual control circuits corresponding to the respective winding systems mutually exchange a state signal containing a power supply state of the winding group of the corresponding winding system as an operating state of the winding system.

5. The vehicle control apparatus according to claim 1, wherein
   the motor produces a torque to be applied to a steering mechanism of a vehicle, and
   the control circuit is configured to calculate the target torque in accordance with a steering state.

* * * * *